(12) United States Patent
Cain (10) Patent No.: US 11,829,414 B2
(45) Date of Patent: *Nov. 28, 2023

(54) METHODS OF STORING MEDIA FILES AND RETURNING FILE DATA FOR MEDIA FILES AND MEDIA FILE SYSTEMS

(71) Applicant: GRASS VALLEY LIMITED, Newbury (GB)

(72) Inventor: James Westland Cain, Newbury (GB)

(73) Assignee: GRASS VALLEY LIMITED, Newbury (GB)

( * ) Notice: Subject to any disclaimer, the term of this patent is extended or adjusted under 35 U.S.C. 154(b) by 81 days.

This patent is subject to a terminal disclaimer.

(21) Appl. No.: 17/451,764

(22) Filed: Oct. 21, 2021

(65) Prior Publication Data
US 2022/0035861 A1 Feb. 3, 2022

Related U.S. Application Data

(63) Continuation of application No. 16/159,150, filed on Oct. 12, 2018, now Pat. No. 11,176,197, which is a
(Continued)

(30) Foreign Application Priority Data

Apr. 15, 2016 (GB) ...................... 1606597

(51) Int. Cl.
*G06F 16/00* (2019.01)
*G06F 16/78* (2019.01)
(Continued)

(52) U.S. Cl.
CPC .......... *G06F 16/7867* (2019.01); *G06F 16/73* (2019.01); *G11B 27/105* (2013.01);
(Continued)

(58) Field of Classification Search
CPC .. G06F 16/7867; G06F 16/73; Y10S 707/913; Y10S 707/914; Y10S 707/915
See application file for complete search history.

(56) References Cited

U.S. PATENT DOCUMENTS

| 6,675,174 B1 | 1/2004 | Bolle et al. |
| 2004/0184744 A1 | 9/2004 | Uekawa |

(Continued)

FOREIGN PATENT DOCUMENTS

| EP | 2947886 A1 | 11/2015 |
| EP | 2589221 B1 | 7/2016 |

(Continued)

OTHER PUBLICATIONS

Saravanan, "Segment Based Indexing Technique For Video Data File," 4th International Conference on Recent Trends in Computer Science & Engineering, ScienceDirect.com, Procedia Computer Science 87 (2016) pp. 12-17. (Year: 2016).*

(Continued)

*Primary Examiner* — Cheryl Lewis
(74) *Attorney, Agent, or Firm* — ARENTFOX SCHIFF LLP (57) ABSTRACT

A media file system, apparatus, computer program product and method for storing a media file in a media file system. An exemplary method includes obtaining a predetermined number of frames and determining a set of portions for storing the media file, each portion having an identifier that is indicative of a multiple of the predetermined number of frames. Further, for each portion of the set of portions, associating with the portion the segment of the media file containing the frame indicated by the identifier of the portion, and associating each of the remaining segments of the media file with a portion of the set of portions. Moreover, storing the media file in the media file system as the set of
(Continued)

determined portions, each portion comprising its associated segments of the media file.

20 Claims, 5 Drawing Sheets

Related U.S. Application Data continuation of application No. PCT/GB2017/051057, filed on Apr. 13, 2017.

(51) Int. Cl.

| | | |
|---|---|---|
| *G11B 27/10* | (2006.01) | |
| *H04N 9/804* | (2006.01) | |
| *H04N 21/854* | (2011.01) | |
| *G11B 27/30* | (2006.01) | |
| *H04N 21/845* | (2011.01) | |
| *G06F 16/73* | (2019.01) | |
| *H04L 67/06* | (2022.01) | |

(52) U.S. Cl.
CPC .............. *G11B 27/30* (2013.01); *H04L 67/06* (2013.01); *H04N 9/8045* (2013.01); *H04N 21/8456* (2013.01); *H04N 21/85406* (2013.01)

(56) References Cited

U.S. PATENT DOCUMENTS

| | | |
|---|---|---|
| 2009/0063484 A1 | 3/2009 | Caceres |
| 2015/0037002 A1 | 2/2015 | Fastige |
| 2016/0099026 A1 | 4/2016 | Iguchi et al. |

FOREIGN PATENT DOCUMENTS

| | | |
|---|---|---|
| WO | 2006087676 A2 | 8/2006 |
| WO | 2007102862 A1 | 9/2007 |
| WO | 2012046090 A1 | 4/2012 |
| WO | 2014037698 A1 | 3/2014 |

OTHER PUBLICATIONS

Ahmed et al., "Key Frame Extraction and Indexing for Multimedia Databases," Vision Interface '99, Trois-Rivieres, Canada, May 19-21, pp. 506-511. (Year: 1999).*

Bearch and Examination Report dated Dec. 9, 2021, regarding GB2116190.6.

International Search Report and Written Opinion dated Jul. 13, 2017, regarding PCT/GB2017/051057.

Communication pursuant to Article 94(3) EPC received in European Patent Application No. 17726012.2, dated Apr. 16, 2020.

* cited by examiner

METHODS OF STORING MEDIA FILES AND RETURNING FILE DATA FOR MEDIA FILES AND MEDIA FILE SYSTEMS

CROSS REFERENCE TO RELATED APPLICATIONS

The present application is a continuation of U.S. patent application Ser. No. 16/159,150, filed Oct. 12, 2018, which in turn is a continuation of PCT/GB2017/051057 filed Apr. 13, 2017, which claims priority to GB Patent Application No. 1606597.1, filed Apr. 15, 2016, the entire contents of each of which are incorporated herein by reference.

FIELD OF THE INVENTION

The present invention concerns methods of storing media files and returning file data for media files, and media file systems.

BACKGROUND OF THE INVENTION

Media applications and systems, for example video editing or streaming of video over the Internet, often require that only a particular time range of the media in the file be used. For example, a user of a video editing program may wish to edit only a particular time range of a video file, or a user may wish to view only the middle portion of a video file. In order to allow this to be done, it is common for media file formats to divide a file into segments corresponding to particular time ranges, and for an index to be provided that declares where the segments can be found in the file.

Figure 1:
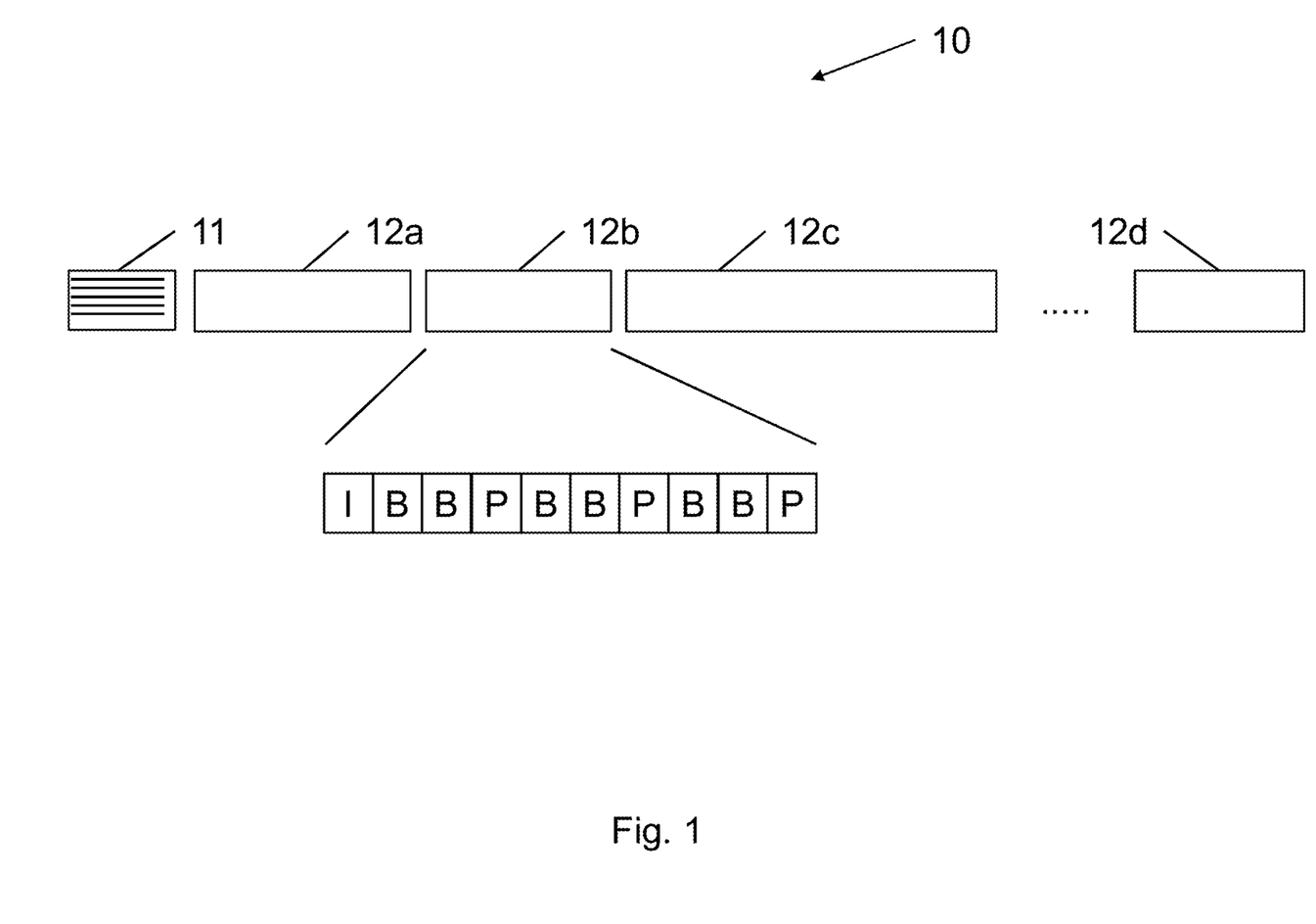
FIG. 1 shows the structure of a conventional MPEG-4 file.

An example of such a media file format is MPEG-4. The structure of an MPEG-4 file is shown in FIG. 1. The file 10 comprises an index 11, and a plurality of GOPs ("groups of pictures") 12a, 12b, 12c to 12d. A GOP is a series of images making up a particular sequence of video. GOPs can contain different numbers of frames, as indicated in FIG. 1 by the GOPs being of different lengths. (GOPs will usually also have different file sizes, i.e. be made up of a different number of bytes, but that is not directly relevant for the present invention).

The frames contained by the GOP 12b are shown as an example in FIG. 1. The GOP 12b contain an initial I-frame (intra coded frame), which is a frame that is coded independently of other frame, i.e. the whole frame can be decoded without referring to any other frames. This is followed by various P-frames (predictive coded frames) and B-frames (bipredictive coded frames), which contain motion-compensated difference information relative to other frames, so can only be decoded with reference to other frames that have already been decoded.

The number of frames in a GOP (and the types of frames it contains) can depend on various factors, including the type of images the video contains, as this can affect how often it is desirable to have an I-frame. The number of frames can also depend upon settings chosen when a media file is generated. For example, if settings are chosen to minimise file size then there may be fewer I-frames, resulting in more frames in a GOP, whereas if flexibility in editing is important there may be more I-frames so fewer frames in a GOP.

Figure 2:
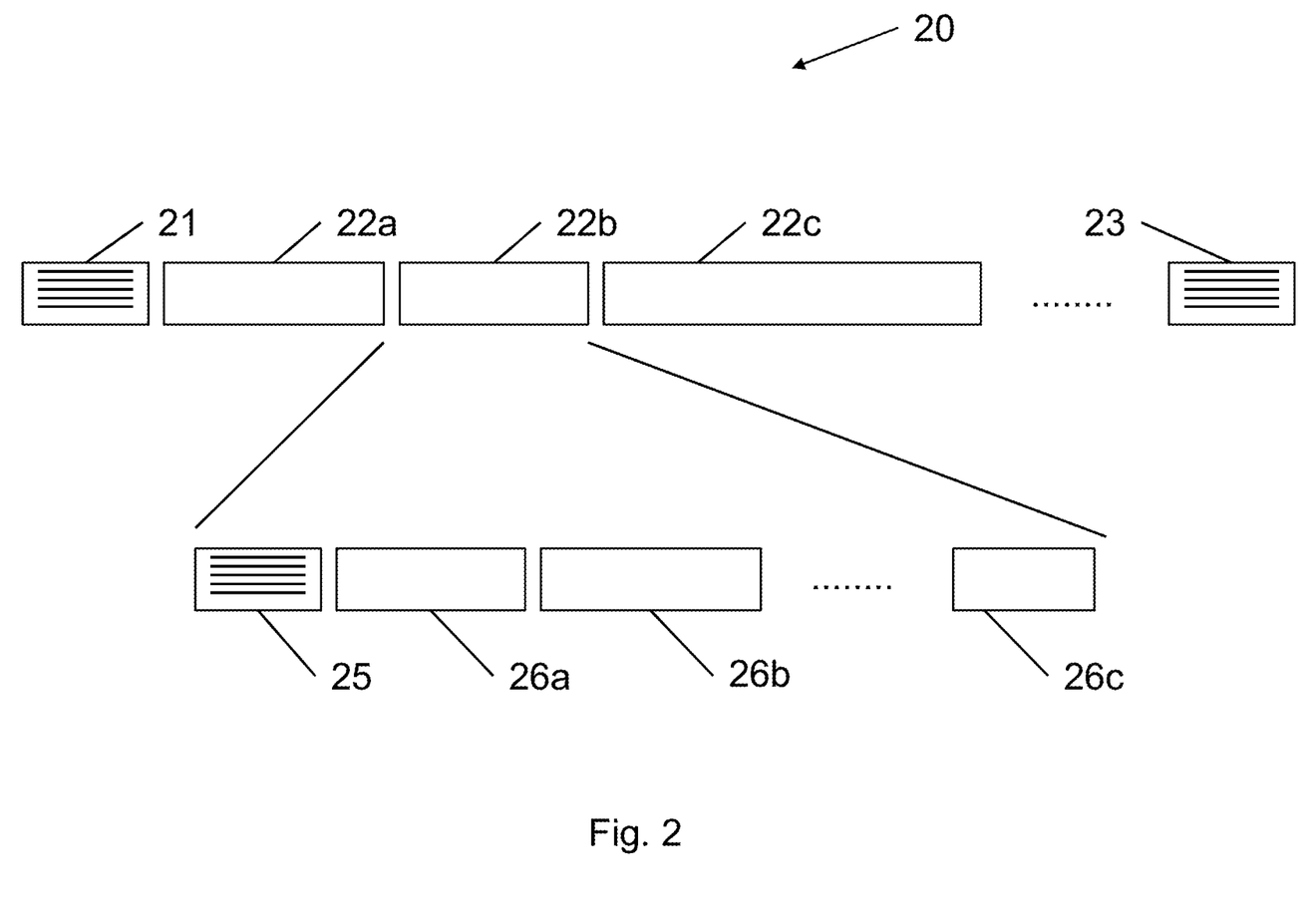
FIG. 2 shows the structure of a fragmented MPEG-4 file.

Another example of such a media file format is fragmented MPEG-4, the structure of which as shown in FIG. 2. A file 20 comprises a header 21, a plurality of "moof"s (movie fragments) 22a, 22b, 22c and so on, and a footer 23. Each moof provides a portion of video of a fixed duration, for example around two seconds of video. FIG. 2 further shows the internal structure of a moof. A moof comprises a header file 25 and a plurality of GOPs 26a, 26b to 26c. Thus, each moof is much the same as a single MPEG-4 file.

The header 21 contains in XML format details of the moofs in the file 20 and the time ranges for the video they contain; for example, that moofs 22a, 22b and 22c provide video in the time ranges 0-2 seconds, 2-4 seconds and 4-6 second respectively.

The footer 23 contains in XML format details of the byte ranges for the moofs in the file 20. As can be seen in FIG. 2, even though each moof contains a fixed duration of video, the moofs themselves are of variable length. Thus, the byte range for a moof in the file 20 cannot be determined merely from its time range, and the footer 23 is required in order to find a particular moof within the file 20.

Having GOPs that contain variable numbers of frames that are located using an index presents various disadvantages, and it is well-known that there are advantages to object-type stores that store data without using an index, for example for the storage of large amounts of data, scalability, flexibility and the like.

The present invention seeks to mitigate the above-mentioned problems. Alternatively or additionally, the present invention seeks to provide improved methods of storing media files and returning file data for media files, and improved media file systems.

SUMMARY OF THE INVENTION

In accordance with a first aspect of the invention there is provided a method of storing a media file in a media file system, wherein the format of the file requires that the file comprises a plurality of segments of file data, each segment comprising file data for a plurality of contiguous frames, the method comprising the steps of:
  obtaining a predetermined number of frames;
  determining a set of portions for storing the media file, each portion having an identifier that is indicative of a multiple of the predetermined number of frames;
  for each portion of the set of portions, associating with the portion the segment of the media file containing the frame indicated by the identifier of the portion;
  associating each of the remaining segments of the media file with a portion of the set of portions;
  storing the media file in the media file system as the set of determined portions, each portion comprising its associated segments of the media file.

In this way, the segments of the media file are distributed between the portions according to the frames they contain. Each portion contains only whole segments, i.e. the segments are not split between portions. When requesting file data for frames, the frame numbers can be used to determine the portion in which the segment containing the file data is most likely stored, using the identifier of the portions. (If the determined portion does not contain the required segment, it can be searched for in other portions, with the method of searching used depending on the way in which the remaining segments are associated with portions.) This is possible despite the fact that the segments may contain variable numbers of frames in ways which cannot be predicted, and most importantly without an index being required to determine the portions in which the segments are contained.

Each remaining segment may be associated with the portion containing the segment containing the closest frames preceding the frames of the remaining segment. Alternatively, each remaining segment may be associated with the portion containing the segment containing the closest frames following the frames of the remaining segment. The remaining segments may be associated in other ways, for example to minimise the number of segments in each portion.

The segments of the media file may be GOPs. The media files may be in conventional MPEG-4 format, fragmented MPEG-4 format, or any other suitable media file format.

Advantageously, the portions are stored as objects in an object store. This can provide the advantages associated with object stores, for example in terms of storage of large amounts of data, scalability, flexibility and the like.

In accordance with a second aspect of the invention there is provided a method of returning file data for a media file stored in a media file system, wherein the media file has been stored in accordance with any of methods described above, the method comprising the steps of:
  receiving a request for file data for one or more frames of the media file from the media file system;
  determining a portion stored in the media file system from the numbers of the requested one or more frames, using the identifier of the portions;
  determining if a segment or segments containing file data for the requested one or more frames are contained in the determined portion, and if so returning file data from the segment or segments;
  in the case that file data for all requested frames has not been returned, determining if a segment or segments containing file data for the requested one or more frames are contained in a portion adjacent to the determined portion, and if so returning file data from the segment or segments.

In this way, using only the requested frame numbers, the portions in which to search for the segments containing the requested frames can be determined. Importantly, no index of the locations of the segments is required.

The determined portion may be the portion with closest identifier preceding the number of the requested one or more frames. Alternatively, the determined portion may be the portion with closest identifier following the number of the requested one or more frames. The determined portion may be selected in other ways, for example by selecting the portion with identifier closest to the number of the requested one or more frames.

The portion adjacent to the determined portion may be the portion with identifier preceding the identifier of the determined portion. Alternatively, the portion adjacent to the determined portion may be the portion with identifier following the identifier of the determined portion. The adjacent portion may be selected in other ways, depending on the particular method by which the remaining segments are associated with the portions when the media file is stored.

The file data for each complete segment may be returned. Alternatively, only the file data for the requested frames may be returned.

In accordance with a third aspect of the invention there is provided a media file system arranged to store a media file in accordance with any of the methods described above.

In accordance with a fourth aspect of the invention there is provided a media file system arranged to return file data for a media file stored in the media file system in accordance with any of the methods described above.

In accordance with a fifth aspect of the invention there is provided a computer program product arranged, when executed, to perform any of the methods described above.

In accordance with a sixth aspect of the invention there is provided a computer program product arranged, when executed, to provide any of the media file systems described above.

It will of course be appreciated that features described in relation to one aspect of the present invention may be incorporated into other aspects of the present invention. For example, the method of the invention may incorporate any of the features described with reference to the apparatus of the invention and vice versa.

Also described herein is a media file system arranged to store a media file, wherein the format of the file requires that the file comprises a plurality of segments of file data, each segment comprising file data for a plurality of contiguous frames, the media file system configured to:
  obtain a predetermined number of frames;
  determine a set of portions for storing the media file, each portion having an identifier that is indicative of a multiple of the predetermined number of frames;
  for each portion of the set of portions, associate with the portion the segment of the media file containing the frame indicated by the identifier of the portion;
  associate each of the remaining segments of the media file with a portion of the set of portions;
  store the media file in the media file system as the set of determined portions, each portion comprising its associated segments of the media file.

Also described herein is a media file system which mau share a media file in the manner described and claimed herein. Such a media file system may be configured to:
  receive a request for file data for one or more frames of the media file;
  determine a portion stored in the media file system from the numbers of the requested one or more frames, using the identifier of the portions;
  determine if a segment or segments containing file data for the requested one or more frames are contained in the determined portion, and if so returning file data from the segment or segments;
  in the case that file data for all requested frames has not been returned, determine if a segment or segments containing file data for the requested one or more frames are contained in a portion adjacent to the determined portion, and if so returning file data from the segment or segments.

The present disclosure also provides a computer program product comprising program instructions configured to program a computing apparatus to provide a media file system. Such a media file system is arranged to store a media file in a media file system, wherein the format of the file requires that the file comprises a plurality of segments of file data, each segment comprising file data for a plurality of contiguous frames, the computer program product configured to:
  obtain a predetermined number of frames;
  determine a set of portions for storing the media file, each portion having an identifier that is indicative of a multiple of the predetermined number of frames;
  for each portion of the set of portions, associate with the portion the segment of the media file containing the frame indicated by the identifier of the portion;
  associate each of the remaining segments of the media file with a portion of the set of portions;
  store the media file in the data store as the set of determined portions, each portion comprising its associated segments of the media file.

The computing apparatus may comprise a data store, a file record database, and a file gateway configured to provide these functions.

The computer program product described above may be configured to program the computing apparatus to:

receive a request for file data for one or more frames of the media file;

determine a portion stored in the media file system from the numbers of the requested one or more frames, using the identifier of the portions;

determine if a segment or segments containing file data for the requested one or more frames are contained in the determined portion, and if so returning file data from the segment or segments;

in the case that file data for all requested frames has not been returned, determine if a segment or segments containing file data for the requested one or more frames are contained in a portion adjacent to the determined portion, and if so returning file data from the segment or segments.

In accordance with a further aspect of the invention there is provided an apparatus comprising a data store configured to store a media file, wherein the format of the file requires that the file comprises a plurality of segments of file data, each segment comprising file data for a plurality of contiguous frames, the apparatus configured to:

obtain a predetermined number of frames;

determine a set of portions for storing the media file, each portion having an identifier that is indicative of a multiple of the predetermined number of frames;

for each portion of the set of portions, associate with the portion the segment of the media file containing the frame indicated by the identifier of the portion;

associate each of the remaining segments of the media file with a portion of the set of portions;

store the media file in the data store as the set of determined portions, each portion comprising its associated segments of the media file.

The apparatus described above may be configured to:

receive a request for file data for one or more frames of the media file;

determine a portion stored in the media file system from the numbers of the requested one or more frames, using the identifier of the portions;

determine if a segment or segments containing file data for the requested one or more frames are contained in the determined portion, and if so returning file data from the segment or segments;

in the case that file data for all requested frames has not been returned, determine if a segment or segments containing file data for the requested one or more frames are contained in a portion adjacent to the determined portion, and if so returning file data from the segment or segments.

DESCRIPTION OF THE DRAWINGS

Embodiments of the present invention will now be described by way of example only with reference to the accompanying schematic drawings of which.

DETAILED DESCRIPTION

Figure 3:
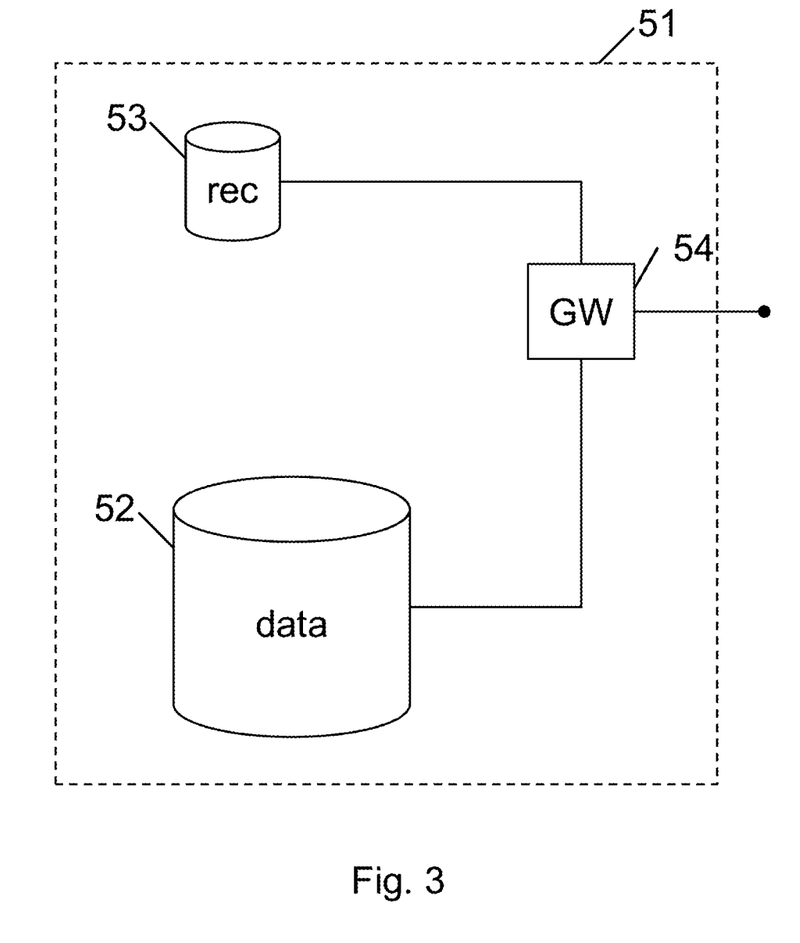
FIG. 3 is a media file system in accordance with an embodiment of the present invention.

A file system in accordance with a first embodiment of the invention is shown in FIG. 3. The file system 51 comprises a data store 52, a file record database 53, and a file system gateway 54. In the present embodiment, the file system 51 is used as part of a system for editing software. The data store 52 of the file system 51 contains original file data for video that can be edited by the editing software. However, the skilled person will appreciate that the file system 51 could equally be used with other systems that request portions of media files, and is not restricted to use only when editing media files.

Figure 4:
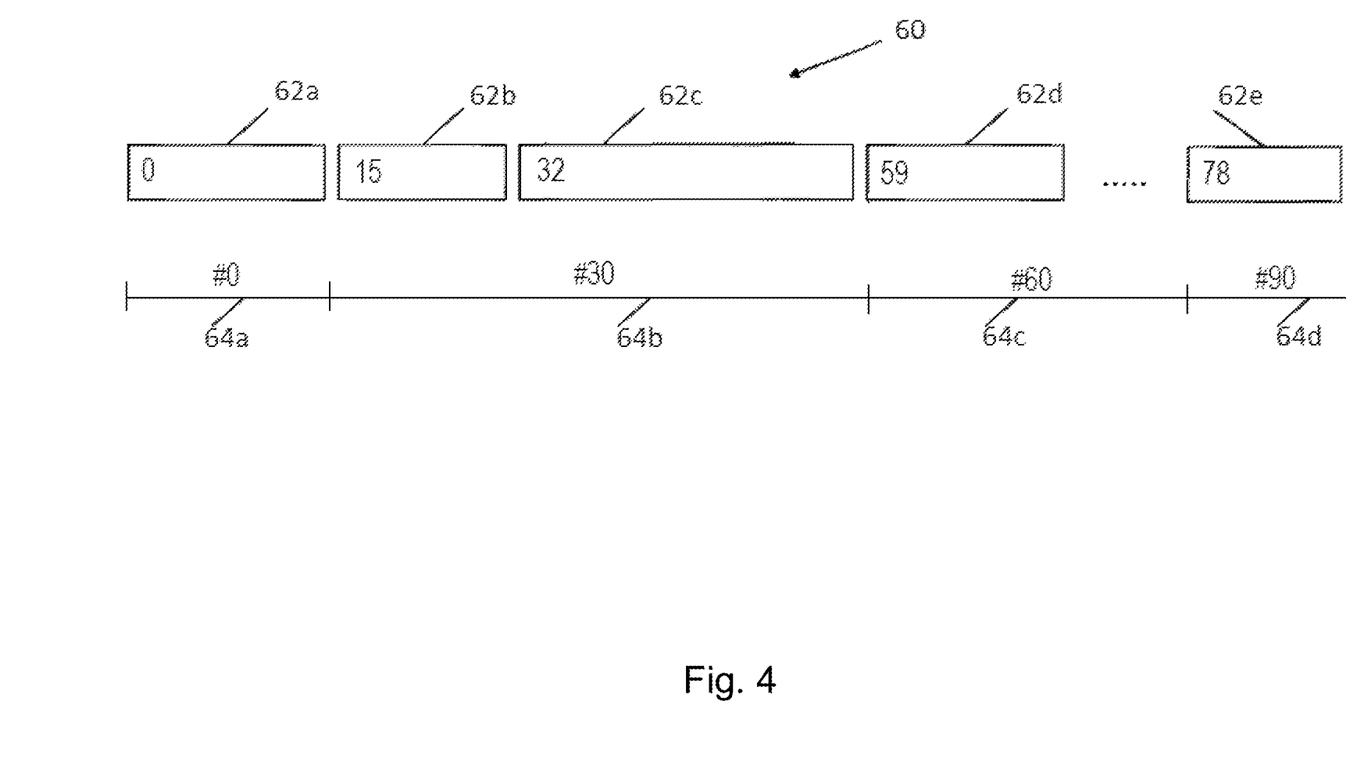
FIG. 4 shows an exemplary conventional MPEG-4 file, divided into portions in accordance with an embodiment of the present invention.

The division of an exemplary conventional MPEG-4 file in accordance with an embodiment of the invention is shown in FIG. 4. Similarly to the MPEG-4 file shown in FIG. 1, the file 60 comprises a plurality of GOPs 62a, 62b, 62c, 62d to 62e. As discussed above, the GOPs are of different lengths (i.e. are made up of a different number of bytes), and each comprise a different number of frames. For example, in the MPEG-4 file shown in FIG. 6, GOP 62a comprises the first fifteen frames of the file (frame numbers 0-14), GOP 62b comprises frame numbers 15-31 and so on. The number of the first frame of each GOP is shown in FIG. 6.

The file 60 is divided into portions 64a, 64b, 64c and 64d, which can be stored separately in the file system 51. Each portion then contains one or more complete GOPs; in other words, GOPs are never split between portions. The portions can, for example, be stored as objects under an object-store type storage scheme.

The GOPs a portion contains are determined using a predetermined number of frames, which in the present example is 30 frames. However, it will be appreciated that a different predetermined number of frames could be used, and a different number could be found particularly suitable for particular types of media file. (For example, a lower number may be appropriate for footage of sporting events than for television drama, as it usually. involves more differences between frames.)

Each portion has a unique identifier which is a multiple of the predetermined number of frames. In the present example, the portions 64a, 64b, 64c and 64d are labelled #0, #30, #60 and #90 respectively. Each portion then contains the GOP containing the frame of its unique identifier. In other words, portion 64a with identifier #0 contains GOP 62a, as GOP 62a contains frame 0; portion 64b with identifier #30 contains GOP 62b, as GOP 62b contains frame 30; portion 64c with identifier #60 contains GOP 62d, as GOP 62d contains frame 60; and portion 64d with identifier #90 contains GOP 62e, as GOP 62e contains frame 90.

The portions then contain any GOPs following the first GOP they contain which are not contained in the next portion, so in this example portion 64b also contains GOP 62c, as this GOP ends at frame 58 and so is not contained in portion 64c.

Figure 5:
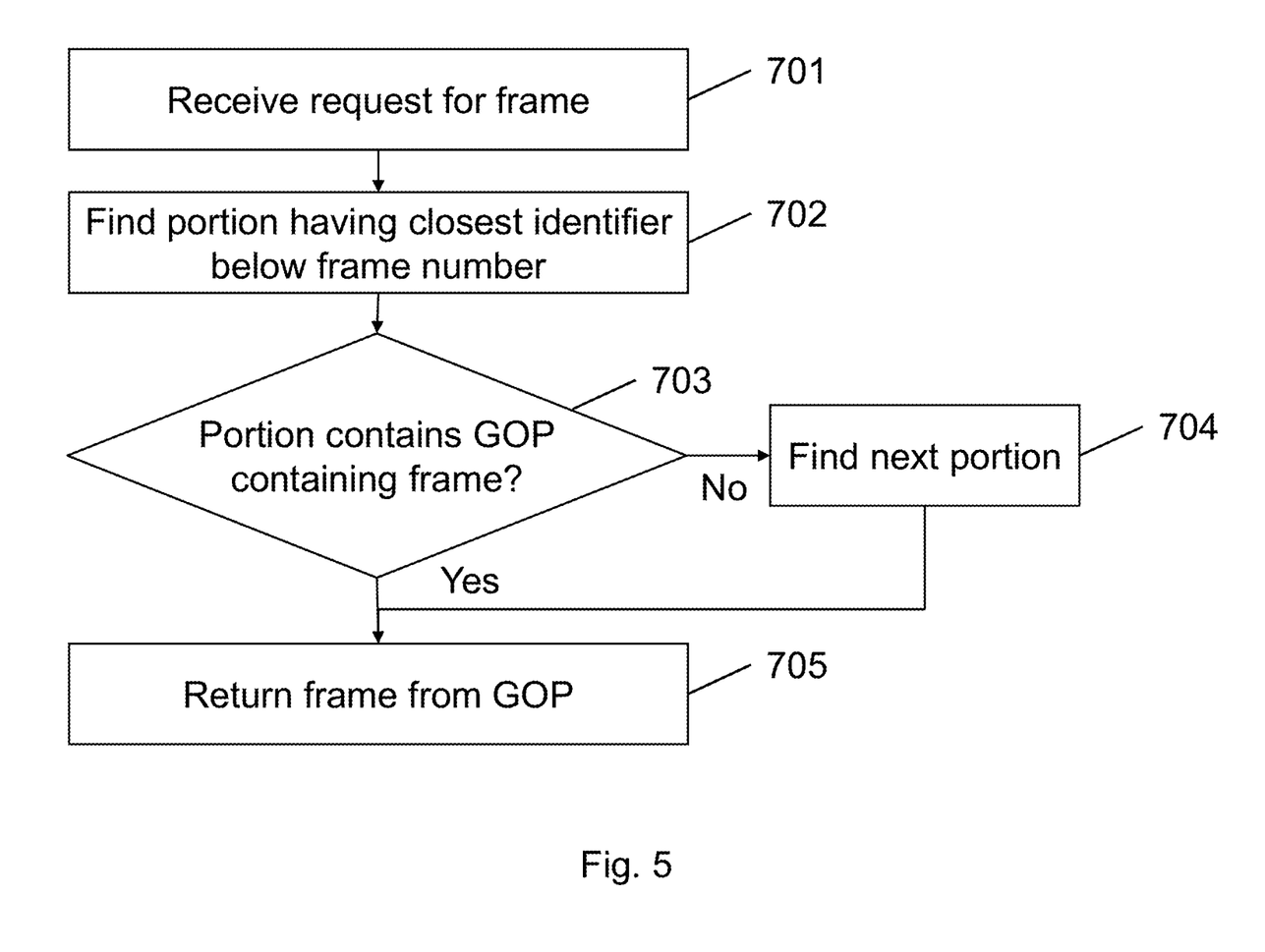
FIG. 5 is a flow chart showing the operation of the file system of FIG. 3 in response to a request for file data.

The operation of the file system 51 in response to a request for file data for a frame is now described with reference to the flowchart of FIG. 5. In the present example only a single frame is requested, but it will be appreciated that a request for a contiguous range of frames could be satisfied in a corresponding fashion.

First, a request for a frame is received (step 701). In the present example, assume frame 43 is requested. The portion having the closest identifier below the frame number is then found (step 702). As the portions are labelled using the predetermined number of frames this is easily done, and for the frame 43 the portion 64b with identifier #30 is found.

It is then checked whether the portion contains a GOP containing the requested frame (step 703). This can easily be done by checking the metadata of the GOPs themselves, or in alternative embodiments the portion itself can contain metadata indicating the GOPs it contains and the frames they in turn contain. In the present example, the portion 64*b* does contain a GOP containing frame 43, the GOP 62*c*. (Notably this is not the only GOP it contains, as it also contains the preceding GOP 62*b*.)

However, had the portion 64*b* not contained a GOP contain frame 43, the next portion would have been found (step 704). This would happen, for example, had the frame 59 been requested. In this case, initially the portion 64*b* with identifier #30 would have been found. However, this portion does not contain GOP 62*d* containing frame 59, as GOP 62*d* is in the next portion 64*c* with identifier #60.

Once the GOP containing the requested frame has been found, the frame is obtained from the GOP and returned (step 705).

While the present invention has been described and illustrated with reference to particular embodiments, it will be appreciated that the invention lends itself to many different variations not specifically illustrated herein.

For example, instead of an MPEG-4 file, the invention could be applied in other embodiments to other media files wherein the format of the file requires that it comprises a plurality of segments of contiguous frames.

Further, the skilled person will recognise that a similar method could be applied to fragmented MPEG-4 files, which comprise moofs having essentially the same properties as a single MPEG-4 file.

Rather than always first finding the portion with identifier below the requested frame number, the portion with identifier closest to the requested frame number could be found first, so for example in the above example a request for frame 59 would first find portion 64*c* with identifier #60. Other schemes could be used that attempt to more quickly find the required GOP.

Further, it will be appreciated that the GOPs not containing the frames with the portion identifier number could be distributed between adjacent the portions in other ways, so that it need not always be the case that the GOP containing the identifier frame is the first in the portion. The GOPs could be distributed so as to minimise the number of GOPs in each portion, for example.

The segments described herein may comprise an encoding of a sequence of frames to be decoded together. That encoding may provide data compression. For example, the frames within a segment may be defined by reference to other frames within that segment. For example, frames within a segment (such as B-frames and P-frames) may be defined by reference to other frames (such as I-frames and P-frames), and those other frames are also included within that segment. For example, the segments may comprise essence data for media spanning a particular period of time within the longer period spanned by the media data file as a whole. The segments may be provided as separate data files. The segments may comprise moofs or GOPS. A manifest may be provided, e.g. in a header file, which can enable those segments to provide the complete media data file.

It will be appreciated from the discussion above that the embodiments shown in the Figures are merely exemplary, and include features which may be generalised, removed or replaced as described herein and as set out in the claims. With reference to the drawings in general, it will be appreciated that schematic functional block diagrams are used to indicate functionality of systems and apparatus described herein. It will be appreciated however that the functionality need not be divided in this way, and should not be taken to imply any particular structure of hardware other than that described and claimed below. The function of one or more of the elements shown in the drawings may be further subdivided, and/or distributed throughout apparatus of the disclosure. In some embodiments the function of one or more elements shown in the drawings may be integrated into a single functional unit.

The above embodiments are to be understood as illustrative examples. Further embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

In some examples, one or more memory elements can store data and/or program instructions used to implement the operations described herein. Embodiments of the disclosure provide tangible, non-transitory storage media comprising program instructions operable to program a processor to perform any one or more of the methods described and/or claimed herein and/or to provide data processing apparatus as described and/or claimed herein.

It will be appreciated that the media file system may comprise a processor, and that said processor may be implemented with fixed logic such as assemblies of logic gates or programmable logic such as software and/or computer program instructions executed by a processor. Other kinds of programmable logic include programmable processors, programmable digital logic (e.g., a field programmable gate array (FPGA), an erasable programmable read only memory (EPROM), an electrically erasable programmable read only memory (EEPROM)), an application specific integrated circuit, ASIC, or any other kind of digital logic, software, code, electronic instructions, flash memory, optical disks, CD-ROMs, DVD ROMs, magnetic or optical cards, other types of machine-readable mediums suitable for storing electronic instructions, or any suitable combination thereof. Such data storage media may also provide the data storage 33 of the video streaming device.

In some embodiments the file system gateway 54 is an interface configured to connect the file system with a client. Such a connection may be via a local area network, or a wide area network. Any suitable network may be used in the present invention. Examples of local area networks include, but are not limited to Ethernet, Wi-Fi, Bluetooth or other such technologies. Whilst wide area networks include, but are not limited to, the internet and GSM, or other such technologies.

In some embodiments the segments stored in the media file system may comprise essence data compressed according to the codec of the media file and relating to a defined time period of the media (e.g. audio, visual or audio-visual data) contained by the file. They may be part of any codec, and are not limited to an MPEG 4 codec. The segments may be GOPs, moofs, or other files. Other codecs include, but are not limited to, Ogg, ASF, Quicktime, RealMedia, Matroska, DivX Media Format, and ISO. A segment is a part of a media file system that may be sent used, or otherwise manipulated, independently of the rest of the media file. A segment may also be used, sent, or otherwise manipulated in conjunction with other segments.

What is claimed:

1. A media file system for storing a media file comprising:
   a media file analyzer configured to analyze a media file to determine a plurality of segments of file data and a plurality of contiguous video frames contained in each segment of the plurality of segments, respectively;

a file divider configured to divide the media file into a set of portions that are each assigned a unique identifier that is a multiple of a predetermined number of video frames, with each portion of the set of portions containing:
(i) the respective segment of the plurality of segments that contains a video frame that corresponds to the unique identifier of the respective portion, and
(ii) at least one segment of the plurality of segments that contains a closest video frame that either is following the video frames of the respective segment or proceeding the video frames of the respective segment; and a database coupled to the file divider and configured to store the media file in the media file system as the set of portions.

2. The media file system according to claim 1, further comprising a frame number determiner configured to obtain the predetermined number of frames.

3. The media file system according to claim 1, wherein the file divider is further configured to associate each remaining segment of the plurality of segments of the file data with one portion of the set of portions, such that each remaining segment is associated with the respective portion having a video frame that is closest to a video frame of the respective remaining segment.

4. The media file system according to claim 1, wherein the plurality of segments of the file data are GOPs.

5. The media file system according to claim 1, wherein the set of portions are configured as data objects that are stored in an object store comprising the database.

6. The media file system according to claim 1, wherein the media file analyzer is further configured to:
receive, from a client device, a request for file data that includes at least one requested frame of the media file;
determine a portion of the set of portions stored in the database that contains the at least one requested frame using the unique identifier of the respective portion; and
determine if a segment or segments containing the file data for the at least one requested frame is contained in the determined portion, and if so, returning the file data from the determined segment or segments to the client device.

7. The media file system according to claim 6, wherein, when file data for all frames of the at least requested frame has not been returned, the media file analyzer is further configured to determine if a segment or segments containing file data for the at least one requested frame is contained in a portion adjacent to the determined portion, and if so, returning file data from the segment or segments in the portion adjacent to the determined portion.

8. A media file system for storing a media file comprising:
a media file analyzer configured to analyze a media file to determine a plurality of segments of file data and a plurality of contiguous video frames contained in each segment of the plurality of segments, respectively;
a file divider configured to divide the media file into a set of objects that are each assigned a unique identifier that is a multiple of a predetermined number of video frames, with each object containing:
(i) the respective segment of the plurality of segments that contains a video frame that corresponds to the unique identifier of the respective object assigned thereto, and
(ii) at least one segment of the plurality of segments that contains a closest video frame that either is following the video frames of the respective segment or proceeding the video frames of the respective segment;
wherein the file divider configures the media file to be stored under an object-store storage scheme in a database by dividing the media file into the set of objects.

9. The media file system according to claim 8, further comprising a frame number determiner configured to obtain the predetermined number of frames.

10. The media file system according to claim 8, wherein the file divider is further configured to associate each remaining segment of the plurality of segments of the file data with one object of the set of objects, such that each remaining segment is associated with the respective object having a video frame that is closest to a video frame of the respective remaining segment.

11. The media file system according to claim 8, wherein the plurality of segments of the file data are GOPs.

12. The media file system according to claim 8, wherein the media file analyzer is further configured to:
receive, from a client device, a request for file data that includes at least one requested frame of the media file;
determine an object of the set of objects stored in the database that contains the at least one requested frame using the unique identifier of the respective object; and
determine if a segment or segments containing the file data for the at least one requested frame is contained in the determined object, and if so, returning the file data from the determined segment or segments to the client device.

13. The media file system according to claim 12, wherein, when file data for all frames of the at least requested frame has not been returned, the media file analyzer is further configured to determine if a segment or segments containing file data for the at least one requested frame is contained in an object adjacent to the determined object, and if so, returning file data from the segment or segments in the object adjacent to the determined object.

14. A media file system for storing a media file comprising:
means for analyzing a media file to determine a plurality of segments of file data and a plurality of contiguous video frames contained in each segment of the plurality of segments, respectively;
means for configuring the media file to be stored under an object-store storage scheme in a database by dividing the media file into a set of objects that are each assigned a unique identifier that is a multiple of a predetermined number of video frames, with each object containing:
(i) the respective segment of the plurality of segments that contains a video frame that corresponds to the unique identifier of the respective object assigned thereto, and
(ii) at least one segment of the plurality of segments that contains a closest video frame that either is following the video frames of the respective segment or proceeding the video frames of the respective segment.

15. The media file system according to claim 14, further comprising means for determining the predetermined number of frames.

16. The media file system according to claim 14, further comprising means for associating each remaining segment of the plurality of segments of the file data with one object of the set of objects, such that each remaining segment is associated with the respective object having a video frame that is closest to a video frame of the respective remaining segment.

17. The media file system according to claim 14, wherein the plurality of segments of the file data are GOPs.

18. The media file system according to claim 14, further comprising:
   means for receiving, from a client device, a request for file data that includes at least one requested frame of the media file;
   means for determining an object of the set of objects stored that contains the at least one requested frame using the unique identifier of the respective object; and
   means for determining if a segment or segments containing the file data for the at least one requested frame is contained in the determined object, and if so, returning the file data from the determined segment or segments to the client device.

19. The media file system according to claim 18, further comprising means for determining, when file data for all frames of the at least requested frame has not been returned, if a segment or segments containing file data for the at least one requested frame is contained in an object adjacent to the determined object, and if so, returning file data from the segment or segments in the object adjacent to the determined object.

20. The media file system according to claim 14, further comprising the database configured to store the media file to be stored under the object-store storage scheme therein.

\* \* \* \* \*